(12) United States Patent
Gabriel et al.

(10) Patent No.: US 7,369,865 B2
(45) Date of Patent: May 6, 2008

(54) SYSTEM AND METHOD FOR SENDING SMS AND TEXT MESSAGES

(76) Inventors: Manny Gabriel, P.O. Box 4749, Hagatna, GU (US) 96912; Leandro Gabriel, P.O. Box 4749, Hagatna, GU (US) 96912

( * ) Notice: Subject to any disclaimer, the term of this patent is extended or adjusted under 35 U.S.C. 154(b) by 79 days.

(21) Appl. No.: 10/686,820

(22) Filed: Oct. 16, 2003

(65) Prior Publication Data

US 2004/0082348 A1    Apr. 29, 2004

Related U.S. Application Data

(60) Provisional application No. 60/419,804, filed on Oct. 17, 2002.

(51) Int. Cl.
*H04Q 7/20* (2006.01)
*H04M 11/00* (2006.01)

(52) U.S. Cl. .............. 455/466; 455/426.1; 455/406

(58) Field of Classification Search ............ 455/466, 455/426.1, 566, 406, 407, 408
See application file for complete search history.

(56) References Cited

U.S. PATENT DOCUMENTS

| | | | |
|---|---|---|---|
| 5,351,235 A | 9/1994 | Lahtinen | 370/58.1 |
| 5,608,786 A | 3/1997 | Gordon | 379/100 |
| 5,768,509 A * | 6/1998 | Gunluk | 709/203 |
| 5,896,369 A | 4/1999 | Warsta et al. | 370/338 |
| 5,923,659 A | 7/1999 | Curry et al. | 370/401 |
| 5,943,399 A | 8/1999 | Bannister et al. | 379/88.17 |
| 6,061,572 A | 5/2000 | Laiho | 455/466 |
| 6,061,718 A | 5/2000 | Nelson | 709/206 |
| 6,104,924 A | 8/2000 | Shirai | 455/418 |
| 6,125,281 A | 9/2000 | Wells et al. | 455/466 |
| 6,178,331 B1 | 1/2001 | Holmes et al. | 455/466 |
| 6,188,887 B1 | 2/2001 | Joong et al. | 455/417 |
| 6,292,668 B1 | 9/2001 | Alanara et al. | 455/466 |
| 6,311,055 B1 * | 10/2001 | Boltz | 455/414.1 |
| 6,314,108 B1 * | 11/2001 | Ramasubramani et al. | 370/465 |
| 6,333,973 B1 | 12/2001 | Smith et al. | 379/88.12 |
| 6,370,389 B1 | 4/2002 | Isomursu et al. | 455/466 |
| 6,370,390 B1 | 4/2002 | Salin et al. | 455/466 |
| 6,389,039 B1 | 5/2002 | Katinakis et al. | 370/474 |
| 6,611,516 B1 * | 8/2003 | Pirkola et al. | 370/352 |
| 6,819,932 B2 * | 11/2004 | Allison et al. | 455/466 |
| 6,947,738 B2 * | 9/2005 | Skog et al. | 455/426.1 |
| 2002/0112014 A1 * | 8/2002 | Bennett et al. | 709/206 |
| 2003/0045309 A1 * | 3/2003 | Knotts | 455/466 |
| 2003/0119532 A1 * | 6/2003 | Hatch | 455/466 |
| 2005/0083918 A1 * | 4/2005 | Tian | 370/356 |
| 2005/0117602 A1 * | 6/2005 | Carrigan et al. | 370/466 |

* cited by examiner

*Primary Examiner*—George Eng
*Assistant Examiner*—Wesley Kim
(74) *Attorney, Agent, or Firm*—Michael C. Cesarano; Feldman Gale P.A.

(57) ABSTRACT

A system and method for sending SMS messages between wireless communications networks. SMS messages are sent to a hardware device in the originating wireless network, which then forwards the message to a management server via the Internet. The management server forwards the message to the appropriate device in the receiving wireless network, which then sends the message to the intended recipient. Replies can then be sent to the originator of the message. Users can also send messages from a computer to a cellular telephone and receive messages sent from a cellular telephone on a computer via email or an HTML based interface. The system can also be used to send and receive messages from a wireless carrier's SMSC.

12 Claims, 10 Drawing Sheets

SYSTEM AND METHOD FOR SENDING SMS AND TEXT MESSAGES

CROSS REFERENCE TO RELATED APPLICATION

This application claims priority from U.S. Provisional Patent Application No. 60/419,804, filed in the United States Patent and Trademark Office on Oct. 17, 2002, and entitled System and Method for Sending SMS and Text Messages.

FIELD OF INVENTION

The present invention relates generally to wireless communications. More particularly, the present invention discloses a system and method for sending Short Message Service (SMS) messages from one cellular network to another cellular network.

BACKGROUND OF THE INVENTION

Wireless and other communication networks are well known and much has been written about them. The organization of such networks into cells is also well known. Text messaging or Short Message Service is provided by the operators of such wireless communication networks, where such networks have the capability of supporting such messaging. Short Message Services, or more simply put "SMS", enables a user to send messages to and receive text messages from other users of a similar communications (cellular) network. The SMS function attempts to deliver a message to a cellular telephone whenever the cellular telephone is registered to the network, even when the terminal is engaged in a voice or data call.

The cellular telephone may also roam throughout the network and still be capable of sending and receiving messages. A cellular telephone configured for SMS provides methods for the user to receive, read, write/edit, clear, send, and save messages.

While SMS is convenient for users communicating within the same network, a user wishing to communicate a text message to a person in a different network often experiences problems. These problems can be as simple as the sender's and receiver's respective carriers deciding not to cooperate and thus not allow the transmission of SMS messages between the networks, or more complicated, such as incompatible digital standards or protocol. The problem of incompatible networks is even more apparent when trying to send messages to a user in a country different from the sender.

Even when communications between networks is possible, the messages are sent through a network bridge and some service providers assign a low priority to SMS messages. This can result in a significant time between the message being sent and the message being received.

Thus there is a need for a method that allows users to send SMS messages between incompatible and distant cellular networks.

DISCLOSURE OF THE INVENTION

It is an object of this invention to provide a system that will allow users to send SMS messages between wireless communication networks over the Internet.

It is also an object of this invention to provide a system wherein a user can send an SMS message using a cellular telephone, and the recipient can retrieve the message using a personal computer.

It is a further object of this invention to provide a system wherein a user can send an SMS message using a personal computer, and the recipient can receive the message on a cellular telephone.

Disclosed herein are a system for and a method of sending SMS messages between cellular networks and other wireless communication networks. As used herein, the term cellular shall be construed to include other types of wireless communication, and the use of the term wireless shall be construed to include cellular communication as well. Additionally, as used herein the term SMS message and the term message shall be construed to mean text messages of the type that are supported by the short message services offered by cellular communication providers.

The system disclosed herein is comprised of a number of physical components. The physical components of the system of the current invention are the SMS devices, user devices, hardware devices, and management servers. Most of the physical components of the system disclosed herein are programmed to function according to an iterative decision making methodology.

The user device is used to initiate and/or terminate SMS messages. The user device is generally a cellular telephone capable of sending and receiving SMS messages. When using the system disclosed herein, SMS messages can also be initiated and received on a personal computer either as email or in a Hyper Text Markup Language (HTML) based interface.

The hardware devices are used to forward SMS messages from cellular communications networks to the management server. One type of hardware device is referred to as an sms device herein. The sms devices are comprised of cellular telephones that are connected to the Internet via computers. The computer of an sms device is generally a PC style computer that is connected to the Internet using standard connection means. The hardware devices are located in a plurality of cellular telephone networks. The sms devices can be used to forward messages that are sent to the server from another sms device or from a user's computer to the intended recipient, and they can be used to forward SMS messages from a user's cellular telephone to the management server.

Another type of hardware device is referred to herein as a gateway device. The gateway devices of the current invention are similar to the sms devices, but they are used only for messages originating from a cellular telephone that will be received on a cellular telephone. The gateway devices are programmed to provide the management server with information concerning the routing of the message, which is not provided by the sms devices.

The number of hardware devices in any given network is determined by the anticipated service demand and the desired level of service for that given network. Ultimately, devices could be setup linking more and more networks, in more countries, thus creating one worldwide homogeneous communications network.

The management servers are computers that are set up on the Internet network for worldwide access. Management servers are programmed to complete a variety of tasks. These tasks include routing the SMS messages to the desired recipient, providing an email and HTML based interface with a user's computer, providing a link between wireless communications carriers' Short Message Service Centers (SMSC) and the system that is the subject of this application, and tracking users' account information. Management services do not have to be located in any specific network, and one management server can be used to pass SMS messages between a plurality of networks.

A user desiring to send a message to a person in a different network can key in his or her text message and send that message to the hardware device in his or her network. The cellular telephone on the hardware device receives the message and sends it to the computer.

The hardware device computer then sends the message to the management server via the Internet. The management server forwards the message to the hardware device in the desired recipient's network, over a previously established route or by establishing a new route, and the message is forwarded to the recipient via the cellular telephone of the hardware device.

The system disclosed herein includes a number of algorithms that are programmed into various physical components of the system through the use of software, hardware, or firmware. These programs enable the various physical components of the system to send, receive, and forward messages.

The system disclosed herein enable the person who was not able to send a message to a certain network, to not only send from a mobile phone from another carrier network, but also send and receive messages from one of the client programs from any computer anywhere worldwide. Additionally, the system disclosed herein allows users to send messages to distant networks without the worry that the message will receive a low priority for transmission over a network bridge, thereby alleviating the concern that the message may be unduly delayed.

BRIEF DESCRIPTION OF THE DRAWINGS

The several objectives and features of the present invention will become more readily apparent from the following detailed description taken in conjunction with the accompanying drawings in which.

DETAILED DESCRIPTION OF THE INVENTION

Figure 1A:
FIG. 1a shows the routing path for an SMS message sent between two countries using methods that are currently available.

Turning now to the drawings, the invention will be described in preferred embodiments by reference to the numerals of the drawing figures wherein like numbers indicate like parts.

According to the current technology shown in FIG. 1a, an SMS message sent between cellular networks in two separate countries must first go through the local wireless network provider 104 of the sender's network, over the long distance Public Switch Telephone Network, and through the wireless network provider 106 of the recipients network before reaching the recipient. This can cause great delays in the recipient getting the message because service providers often assign low priority to inter-carrier SMS messages, and consequently send them during periods of off peak use.

Figure 1B:
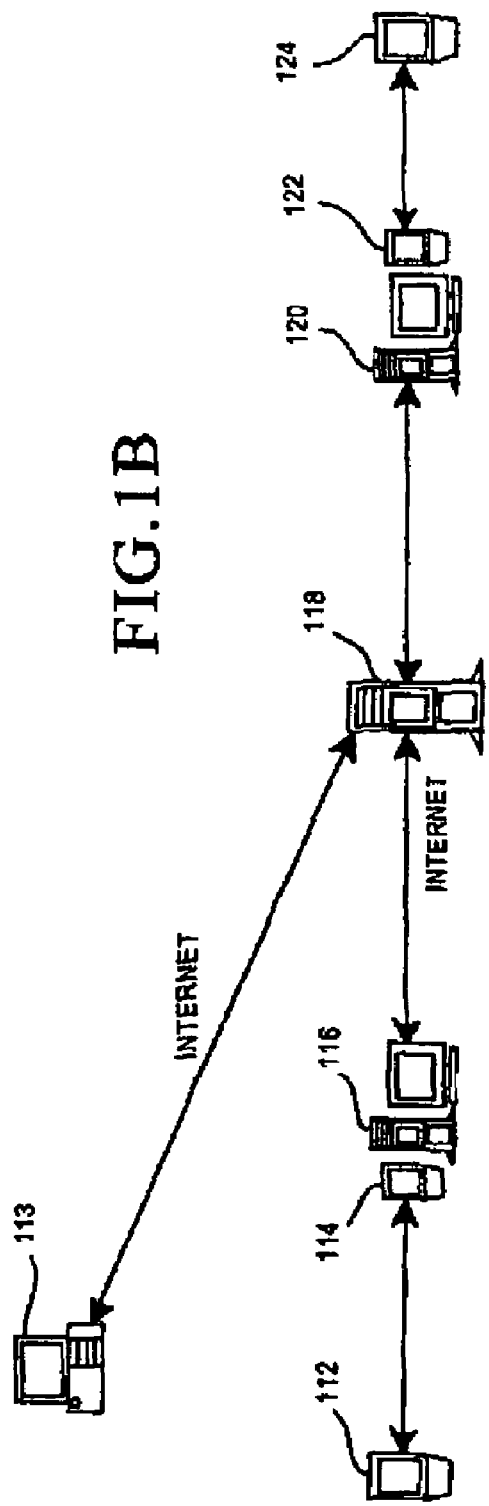
FIG. 1b shows the routing path for an SMS message sent between two countries using the system and method disclosed herein.

The physical components of the system disclosed herein can be seen in FIG. 1b. According to the disclosure herein, a person desiring to send an SMS message to a receiver in a different network sends the message to an hardware device, which is a cellular telephone 114 and a computer 116, in his or her network. The hardware device receives the message via the cellular telephone 114 and sends the message over the Internet via a server/router 118 to a hardware device in the desired user's network/country. The message is then sent to the user through the hardware device, which is also a cellular telephone 122 and a computer 120 and wherein the telephone 122 is a part of the receiver's network.

Also shown in FIG. 1b, the current invention will allow a user to send text messages to a cellular telephone from a personal computer 113 via the Internet and to receive text messages from a cellular telephone on a personal computer. When using the personal computer option, a user can send and receive messages as an email or using an HTML based interface.

In one embodiment of the invention disclosed herein, when a user desires to use the system of the current invention, he or she must first set up an account. Accounts can be set up on the Internet by accessing a web page of a service provider using the system disclosed herein, or by contacting the customer service representatives of such providers. When the user sets up an account, he or she provides the telephone number of his or her cellular telephone that will be used to send SMS messages, and the telephone numbers of the people that will be receiving messages. The user will then assign a recipient identification code to each intended recipient. The recipient identification codes will be programmed into a data file in the management server and used for routing SMS messages. Additional recipients can be added by accessing the provider through the Internet or contacting the customer service representative. Users can also set up their accounts to send and receive messages on the user's computer.

One method for debiting users of the current invention is the use of prepaid calling cards, having a finite value. Each card has a unique identification code assigned to it, and that code or personal identification number (PIN) is programmed into the management server. When a person desiring to send a text message, connects to the hardware device in his or her network, he or she sends the identification code assigned to his or her card as part of the SMS message. After ensuring that the intended recipient has received the message, the management server deducts the cost for sending the SMS message. The first time a user sends a message after purchasing a prepaid card, he or she enters the PIN. The PIN saved in a user data file and the value of the card is credited to that users account. Credit is deducted from the account every time a message is sent successfully.

Other billing methods can also be used, such as assigning individual users a unique identification code and sending bills to users based on the number and length of messages sent during a pre-specified period of time or pre-purchasing credits for sending SMS messages.

According to the disclosure herein an SMS message that originates from a sender's telephone 112 is routed to the telephone 114 that is part of the hardware device. The telephone is connected to the computer 116 using commercially available data cables and software drivers, and the computer is connected to the Internet using standard connection means. Together, the telephone and the computer make up the hardware device. The hardware devices are located within the cellular networks.

The hardware device receives messages from a telephone in the cellular network and sends the messages and the client information to the management server 118, which then sends the message to a hardware device in the desired receiver's network.

The hardware device also checks for messages, from the management server, that are addressed to the cellular network in which the hardware device is located. If there are incoming messages for recipients in the cellular network where the hardware device is located, the hardware device will forward the message to the recipient's cellular telephone. If the recipient is located outside of his or her home network, and there is a hardware device in the network where the recipient is located, the message will be routed to the device in the network where the recipient is located. There are multiple hardware devices located in each cellular network to establish a method of virtual routing so that a single hardware device can be used to provide a service to multiple users.

Figure 2:
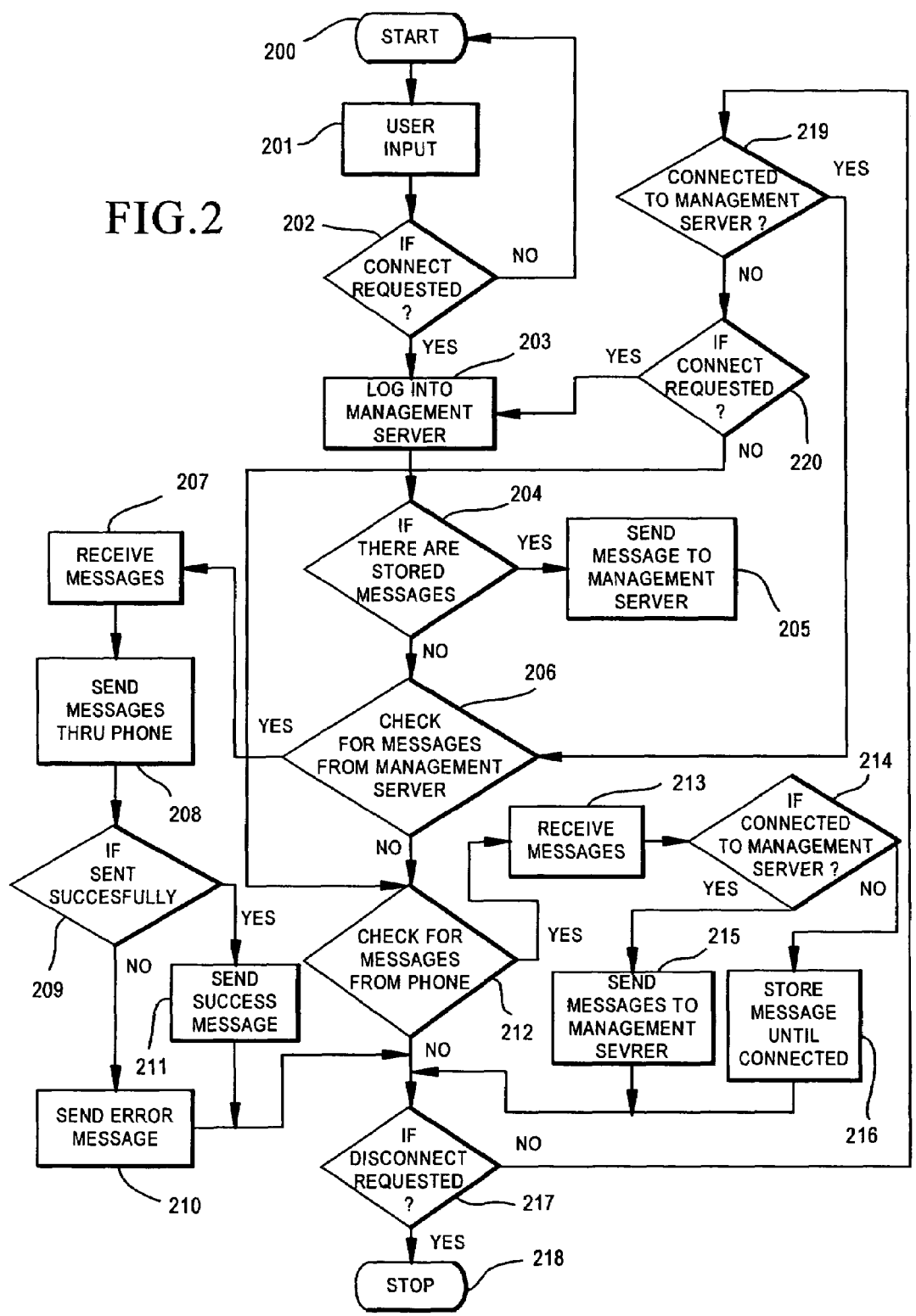
FIG. 2 is a block diagram showing the operational algorithm of the sms devices, according to the disclosure herein.
Figure 3:
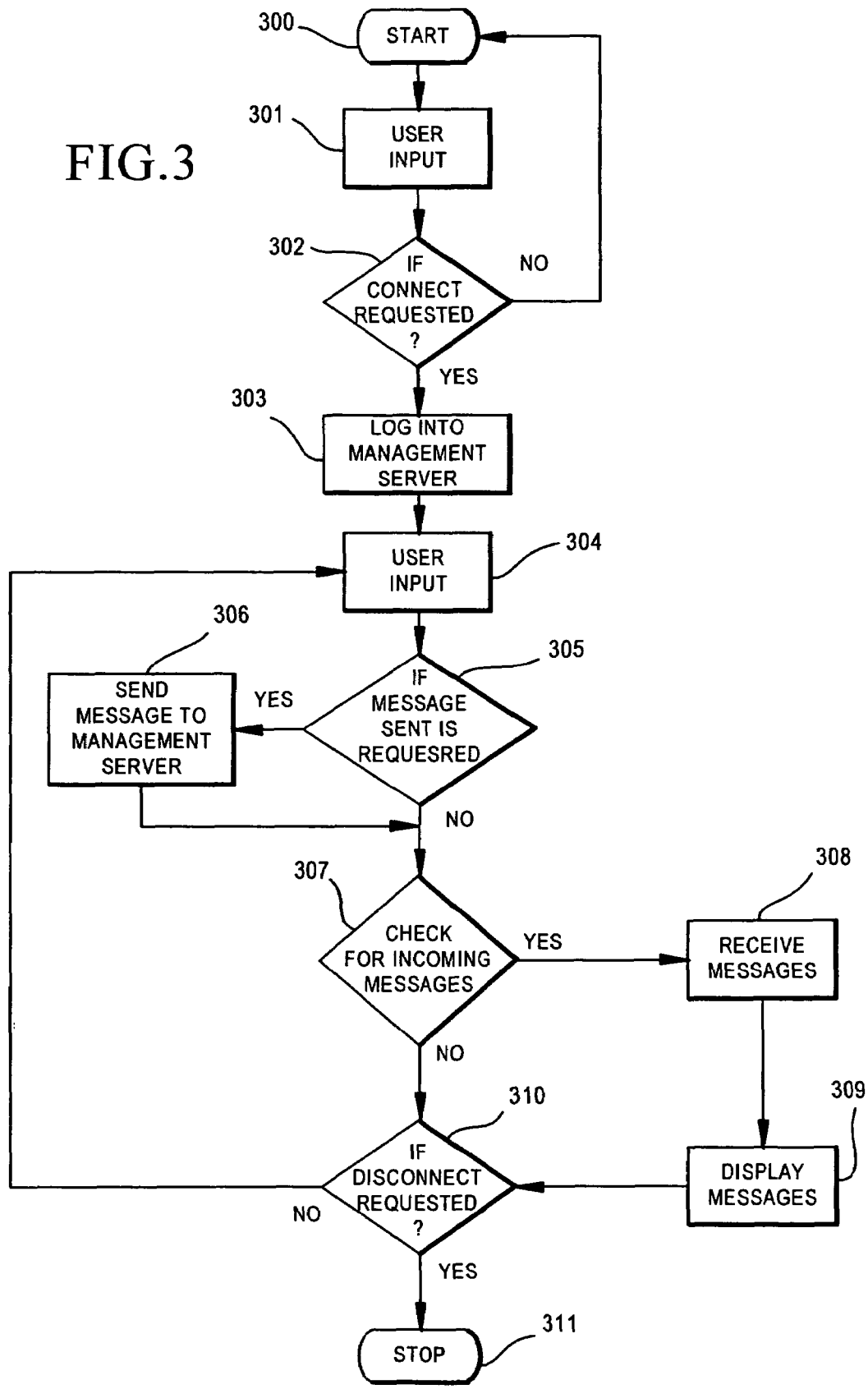
FIG. 3 is a block diagram showing the operational algorithm of the user client program, on a client's computer, according to the disclosure herein.

One type of hardware device is the sms device. The sms device can receive SMS messages from cellular telephones and it can be used to forward SMS messages originate from any type of user device. Referring to FIG. 2, the sms devices in both the sending and receiving networks are programmed to use the following event-driven algorithm for operations:

sms Device Algorithm
1. Determine status of phone and go to 2.
2. Wait for user input.
   a. If there is user input 201, go to 3.
3. Is connection 202 requested.
   a. If yes, log into management server 203 and go to 4.
   b. If no, loop to 1.
4. Check for stored messages 204.
   a. If there are stored messages send them to management server 205 and go to 5.
   b. If there are no stored messages, go to 5.
5. Check for messages from management server 206.
   a. If there are messages from management server, receive the messages 207 and send the messages one at a time through the phone 208, then go to 6.
   b. If there are no messages from the management server, go to 7.
6. Determine if messages were sent successfully 209.
   a. If messages were sent successfully, send success message to management server 211, and go to 9.
   b. If messages were not sent successfully, send error message to management server 210, and go to 9.
7. Check for incoming messages from phone 212.
   a. If there are incoming messages receive the messages 213 and go to 8.
   b. If there are no incoming messages, go to 9.
8. Check connection to management server 214.
   a. If connected to management server, send messages to management server 215 and go to 9.
   b. If not connected to management server, store messages until connection is established 216 and go to 9.
9. Determine if disconnection is requested 217.
   a. If disconnection is requested, stop 218.
   b. If disconnection is not requested, go to 10.
10. Determine if a connection is established with the management server 219.
    a. If a connection is established, loop to 5.
    b. If no connection is established, go to 11.
11. Determine if a connection to the management server has been requested 220.
    a. If a connection has been requested, log into management server 203 and loop to 4
    c. If a connection has not been requested, loop to 7.

Figure 6:
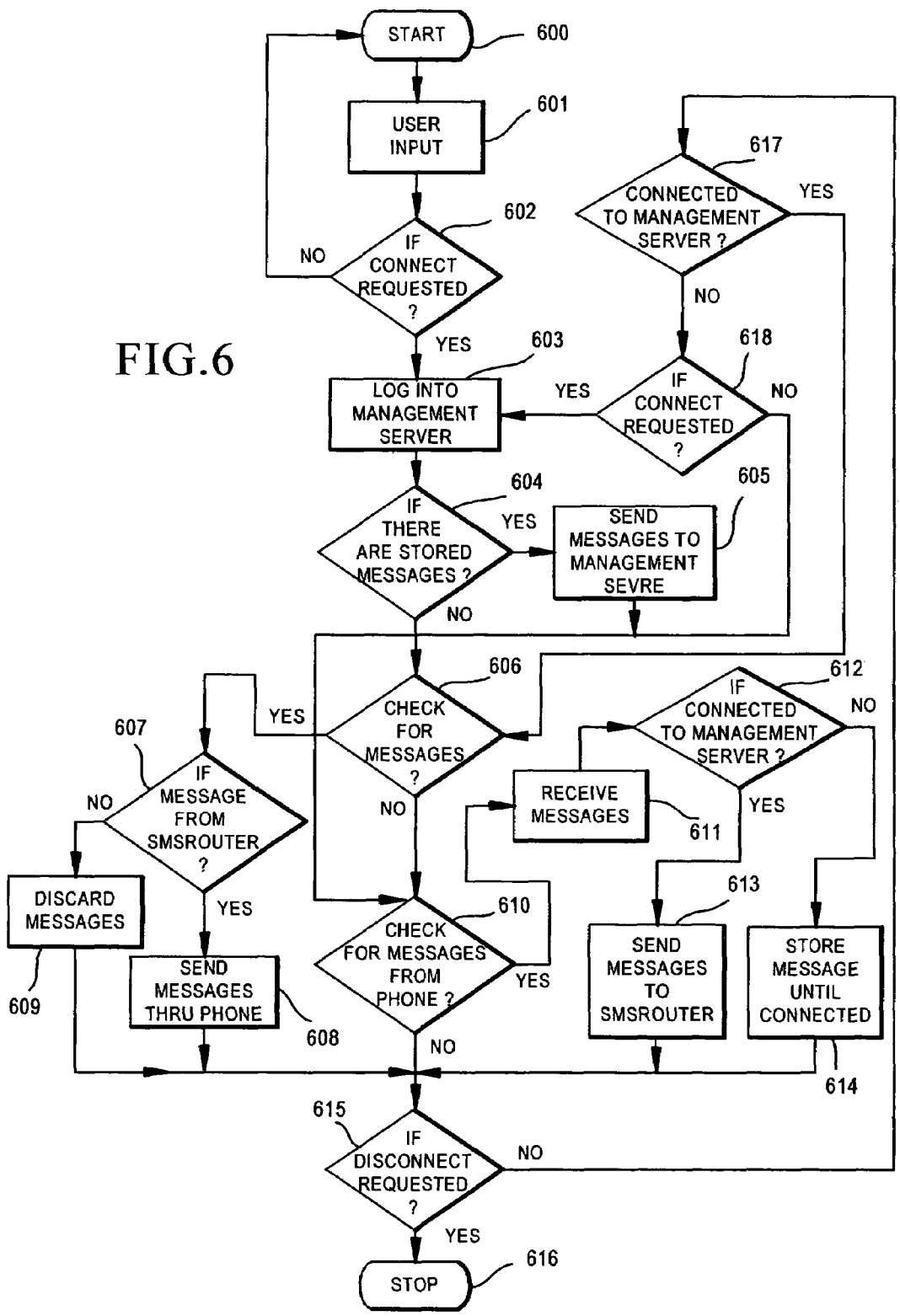
FIG. 6 is a block diagram showing the operational algorithm for the Gateway devices, according to the disclosure herein.

Another type of hardware device known as a gateway can also be used in the system described herein. A gateway is a hardware device that is capable of routing phone to phone SMS messages and providing user account information to the management server (unlike the sms devices which forward messages with no account information). Referring to FIG. 6, the gateways are programmed to use the following event-driven algorithm for operations:

Gateway Algorithm
1. Wait for user input.
   a. If there is user input 601, go to 2.
2. Determine if a connection is requested 602.
   a. If a connection is requested, log into management server 603 and go to 3.
   b. If a connection is not requested, loop to 1.
3. Check for stored messages 604.
   a. If there are stored messages send messages to management server 605 and go to 4.
   b. If there are no stored messages, go to 4.
4. Check for messages from the management server 606.
   a. If there are messages from the management server, go to 5.
   b. If there are no messages from the management server, go to 6.
5. Determine if the message is from the smsrouter program 607.
   a. If the message is from the smsrouter program, send the message through phone 608 and go to 8.
   b. If the message is not from the smsrouter program, discard the message 609 and go to 8.
6. Check for messages from the device phone 610.
   a. If there is a message from the device phone, receive the message 611 and go to 7.
   b. If there is no message from the device phone, go to 8.
7. Check for a connection to the Management server 612.
   a. If there is a connection, send the message to the smsrouter program 613 and go to 8.
   b. If there is no connection, store the message until a connection is established 614 and go to 8.

8. Determine if a disconnection is requested 615.
   a. If a disconnection is requested, disconnect and stop 616.
   b. If a disconnection is not requested, go to 9.
9. Check for a connection to the Management server 617.
   a. If there is a connection, go to 4.
   b. If there is no connection, go to 10.
10. Determine if a connection is requested 618.
    a. If a connection is requested, go to 3.
    b. If a connection is not requested, go to 6.

The system disclosed herein allows text messages to be sent and received on a user's computer via email or an HTML based interface. These messages can be sent from the computer to the intended recipient's cellular telephone, or sent from a cellular telephone and reviewed on a computer. The user's computer is programmed to use the following event-driven algorithm, which is referred to herein as "Web SMS user." Referring the user's computer is programmed to use the following event driven algorithm for operations when sending and receiving text messages on the system disclosed herein:

WEB SMS User Algorithm
1. Wait for user input.
   a. If there is user input 301, go to 2.
2. Check for a connection request 302.
   a. If a connection is requested, log into management server 303 and go to 3.
   b. If a connection is not requested, loop to 1.
3. Wait for user input
   a. If there is user input 304, go to 4.
4. Check for a message send request 305.
   a. If there is a message send request, send message to management server 306 and go to 5.
   b. If there is no message send request, go to 5.
5. Check for incoming messages 307.
   a. If there are incoming messages, receive those messages 308, display those messages 309, and go to 6.
   b. If there are no incoming messages, go to 6.
6. Determine if there is disconnect request 310.
   a. If there is a disconnect request, disconnect and stop 311.
   b. If there is no disconnect request, loop to 3.

The management server routes messages from the hardware device in the sender's network to the sms device in the receiver's network (devices) and to a user's personal computer (for those users that elect this option). The management server also maintains the account information for each client, such as credit and message storage.

Messages can be sent through the management server to current clients via personal computer (users) or the sms devices in the client's cellular network (device), and to the cellular/SMS phones of non-clients. Non-clients can also send return messages to current clients. Once a client sends a message to a non-client, a route is established through one of the sms devices. Subsequently non-clients are then able to send to that client through that particular sms device.

While one management server is capable of supporting communications between numerous networks, it is not envisioned that the number of servers be limited to one. Instead, the number of servers used for the system will be based on the number of people who use the system, the anticipated traffic load on the system, and the desired performance level of the system.

Figure 4:
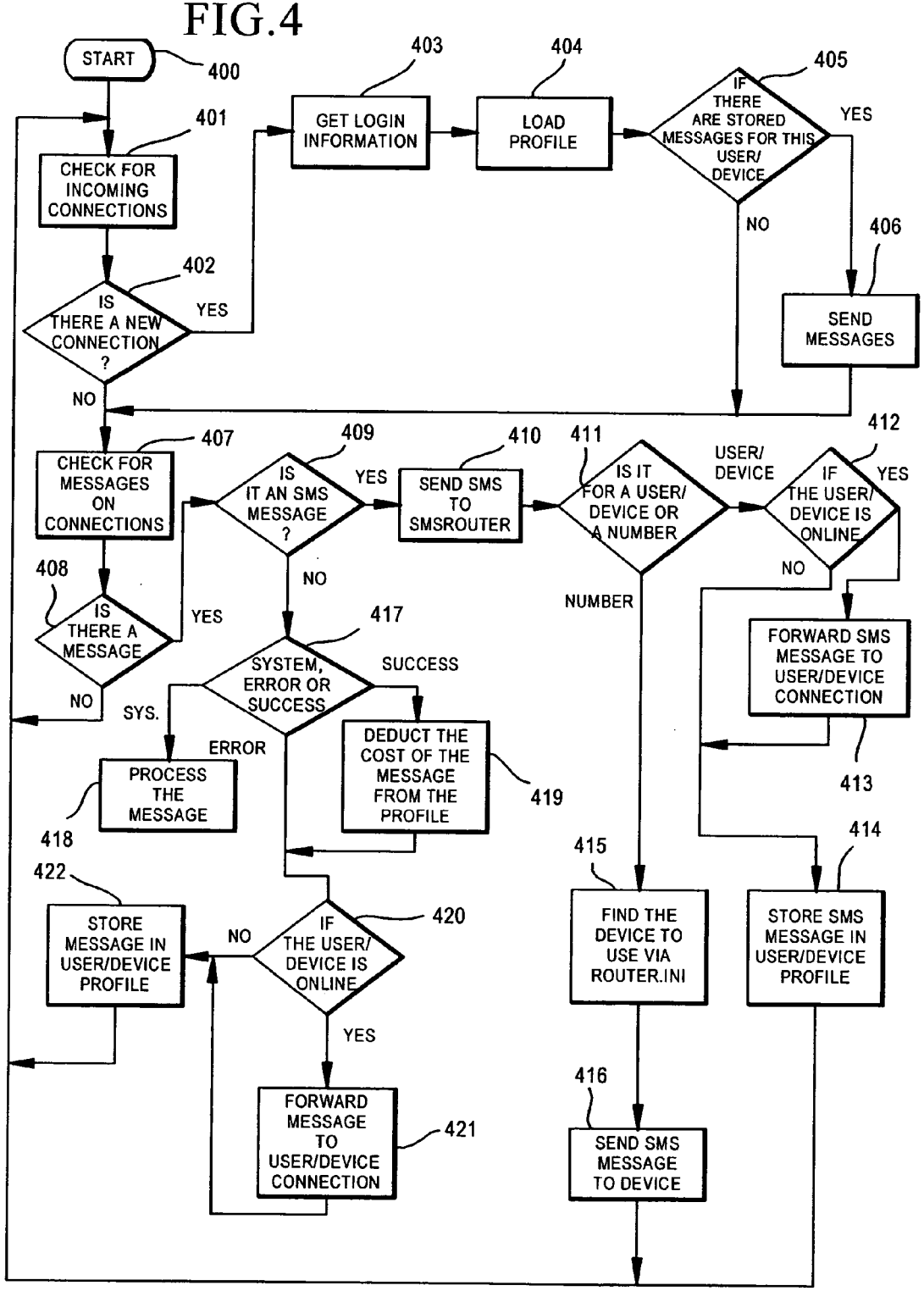
FIG. 4 is a block diagram showing the operational algorithm for the management servers, according to the disclosure herein.

Management servers are programmed to perform a number of tasks, but the main program for operation of the management server is shown below as "Management Server." Referring to FIG. 4, the management servers are programmed to use the following event driven algorithm for operations:

Management Server Algorithm
1. Check for incoming connections 401.
   a. If there is a new connection 402, authenticate the connection by getting the log in information 403, load the user/device profile 404 and go to 2.
   b. If there is no new connection, check for messages on established connections, 407 and go to 3.
2. Check for stored messages for the user/device that established the new connection 405.
   a. If there are stored messages send the messages 406 and go to 3.
   b. If there are no stored messages, check for messages on established connections 407, and go to 3.
3. Check for incoming messages 408.
   a. If there is an incoming message, go to 4.
   b. If there is no incoming message, loop to 1.
4. Determine if the message an SMS message 409.
   a. If it is an SMS message, send the SMS message to the SMS Router for additional processing and go to 5.
   b. If it is not an SMS message go to 7.
5. Determine if the incoming SMS message is for a user/device or an SMS phone.
   a. If it is for a user/device, go to 6.
   b. If it is for an SMS phone, determine the Hardware/sms device to use from the Route.ini file 415, send the message to the appropriate device 416, and loop to 1.
6. Determine if the user/device is online 412.
   a. If the user/device is online, forward the message to the user/device 413, store the message in the user/device profile 414, and loop to 1.
   b. If the user/device is not online, store the message in the user/device profile 414 and loop to 1.
7. Determine if the message is a message for the system, an error message, or a success message 417.
   a. If the message is for the system, parse the message and execute the command 418.
   b. If the message is an error message, go to 8.
   c. If the message is a success message, deduct the cost of the message from the user profile 419 and go to 8.
8. Determine if the originating user/device is online 420.
   a. If the originating user/device is online, forward the message to the user/device 421, store the message in the user/device profile 422, and loop to 1.
   b. If the user/device is not online, store the message in the user/device profile 422, and loop to 1.

The management servers can also be programmed to establish virtual routing with use of the route.ini file. The route.ini file contains the country codes and area codes for networks containing sms devices, and other routing information for future messaging.

Every time a user sends a message to a number, the management server will remember the number by storing it in this file. Thus making it easier for the message to get back to the intended recipient when a reply is sent to the user. Since all routing information is based on user/device information, it does not matter whether the message is PC originated or phone originated. The route.ini file also allows non-clients to reply to text messages from a client through the same sms device, in the non-client's cellular network, that forwarded the message to the non-client.

The route.ini file also contains information on the cellular phone networks served by each sms device. When a message is sent to a non-client's telephone, the management server will access the route.ini file to determine which sms device to forward the message to.

The Route.ini file is a data file that follows a standard initialization file format. It is used to allow the application to assign a virtual route to a user. Virtual routing allows the management server to assign one hardware device phone to many users, instead of having to assign one number to one user.

Figure 9A:
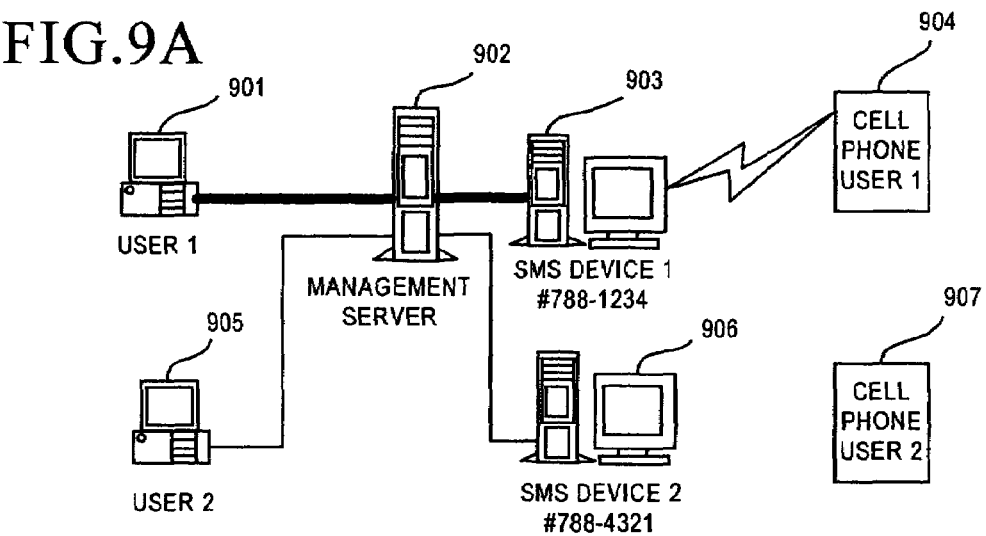
FIGS. 9a-9c show examples of virtual routing diagrams according to the current invention.
Figure 9B:
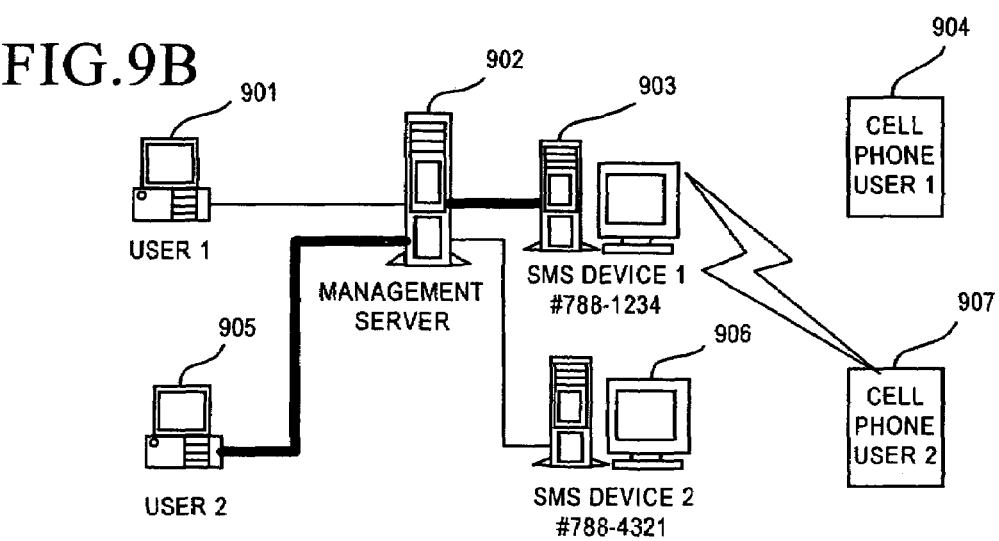
Figure 9C:
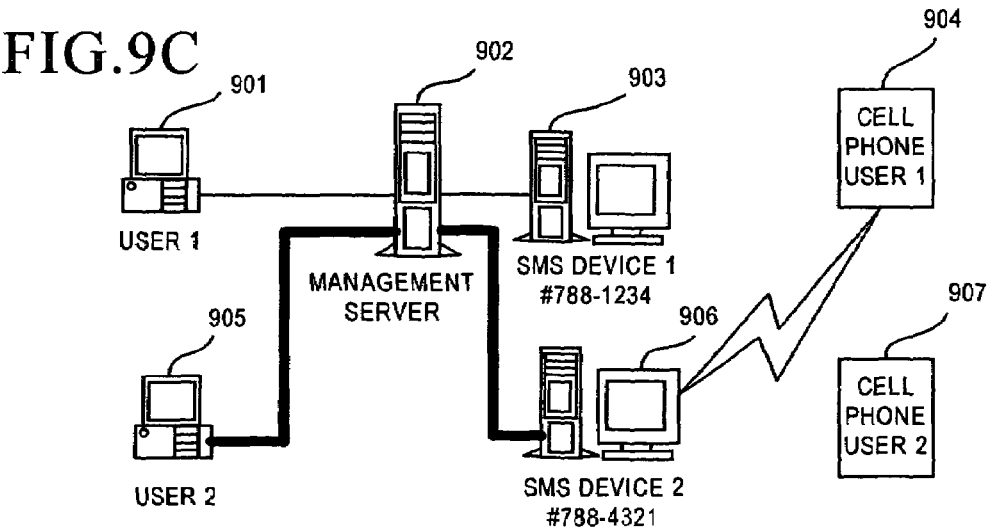

Referring to FIGS. 9a through 9c, in FIG. 9a, when user 1 (901) sends a message to cell phone user 1 (904), the management server 902 uses virtual routing to establish a route for the message to take. In this case sms device 1 (903). Subsequently when cell phone user 1 sends a message to sms device 1, the message will be routed back to user 1.

In FIG. 9b, the same thing happens when user 2 (905) sends a message to cell phone user 2 (907). A route is established through sms device 1. When cell phone user 2 sends a message to device 1, the message will be sent to user 2. This method of virtual routing establishes a single sms device that provides a service to multiple users.

Referring now to FIG. 9c, when user 2 sends a message to cell phone user 1, a route is established through sms device 2 (906) since user 1 has already established the route to cell phone user 1 through sms device 1. Thus when cell phone user 1 responds to sms device 2, the message will be routed to user 2.

While FIGS. 9a-9c illustrate virtual routing using sms devices; this type of routing is also used for gateway devices.

The computer that contains the management server also performs several other functions and is therefore loaded with several other programs. These programs include a routing program, a bridging program, a program that allows a client to send and retrieve messages on his or her computer using an HTML based interface, and a program that allows clients to send and retrieve messages using email. The algorithm for these programs is described below.

Figure 5:
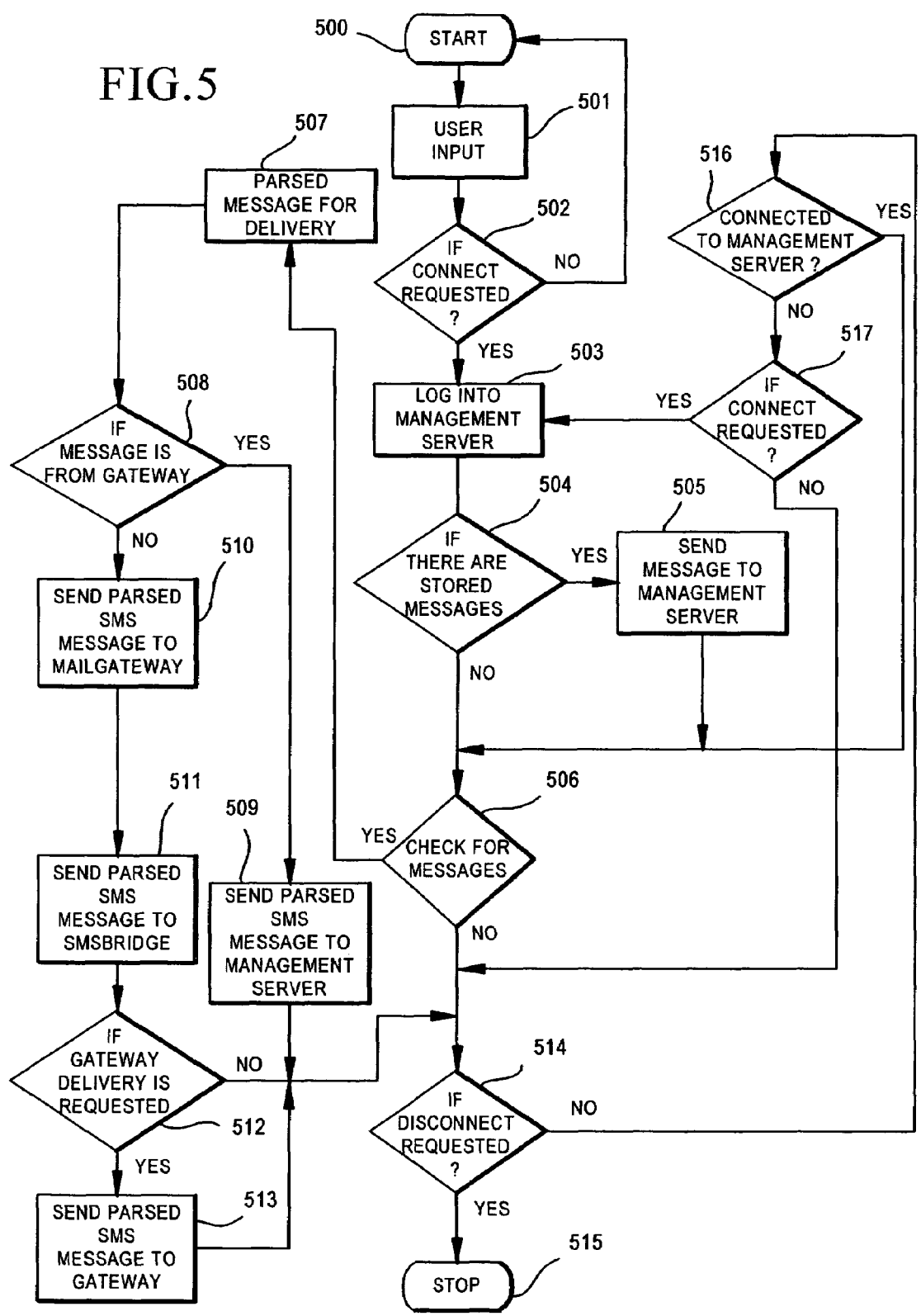
FIG. 5 is a block diagram showing the operational algorithm for the SMS router, according to the disclosure herein.

The routing program adds routing capabilities for interfacing with other technologies and email. It also serves as the primary avenue for routing phone-to-phone SMS messages. All messages that the management server receives are sent to the routing program. The routing program then forwards the messages based on the configuration of the user's account. The routing program is referred to below as "SMSrouter." Referring to FIG. 5, the routing program operates according to the following event driven algorithm:

SMSrouter Algorithm
1. Wait for user input.
   a. If there is user input 501, go to 2.
2. Determine if a connection is requested 502.
   a. If a connection is requested, log into management server 503 and go to 3.
   b. If a connection is not requested, loop to 1.
3. Check for stored messages 504.
   a. If there are stored messages send messages to management server 505 and go to 4.
   b. If there are no stored messages, go to 4.
4. Check for messages from the management server 506.
   a. If there are messages from the management server, parse the message for delivery 507 and go to 5.
   b. If there are no messages from the management server, go to 7.
5. Determine if the message is from a gateway 508.
   a. If the message is from a gateway, return the parsed message to the management server 509 and go to 7.
   b. If the message is not from a gateway, send the parsed message to the email program 510 and the bridging program 511 and go to 6.
6. Determine if the user account indicates that gateway delivery is requested 512.
   a. If gateway delivery is requested, send the message to a gateway 513 and go to 7.
   b. If gateway delivery is not requested, go to 7.
7. Determine if a disconnection is requested 514.
   a. If there is a disconnection request, disconnect and stop 515.
   b. If there is no disconnection request, go to 8.
8. Check for a connection to the management server 516.
   a. If there is a connection, go to 4.
   b. If there is no connection, go to 9.
9. Determine if there is a connection request 517.
   a. If there is a connection request, log into management server 503 and go to 3.
   b. If there is no connection request, go to 7.

Figure 7:
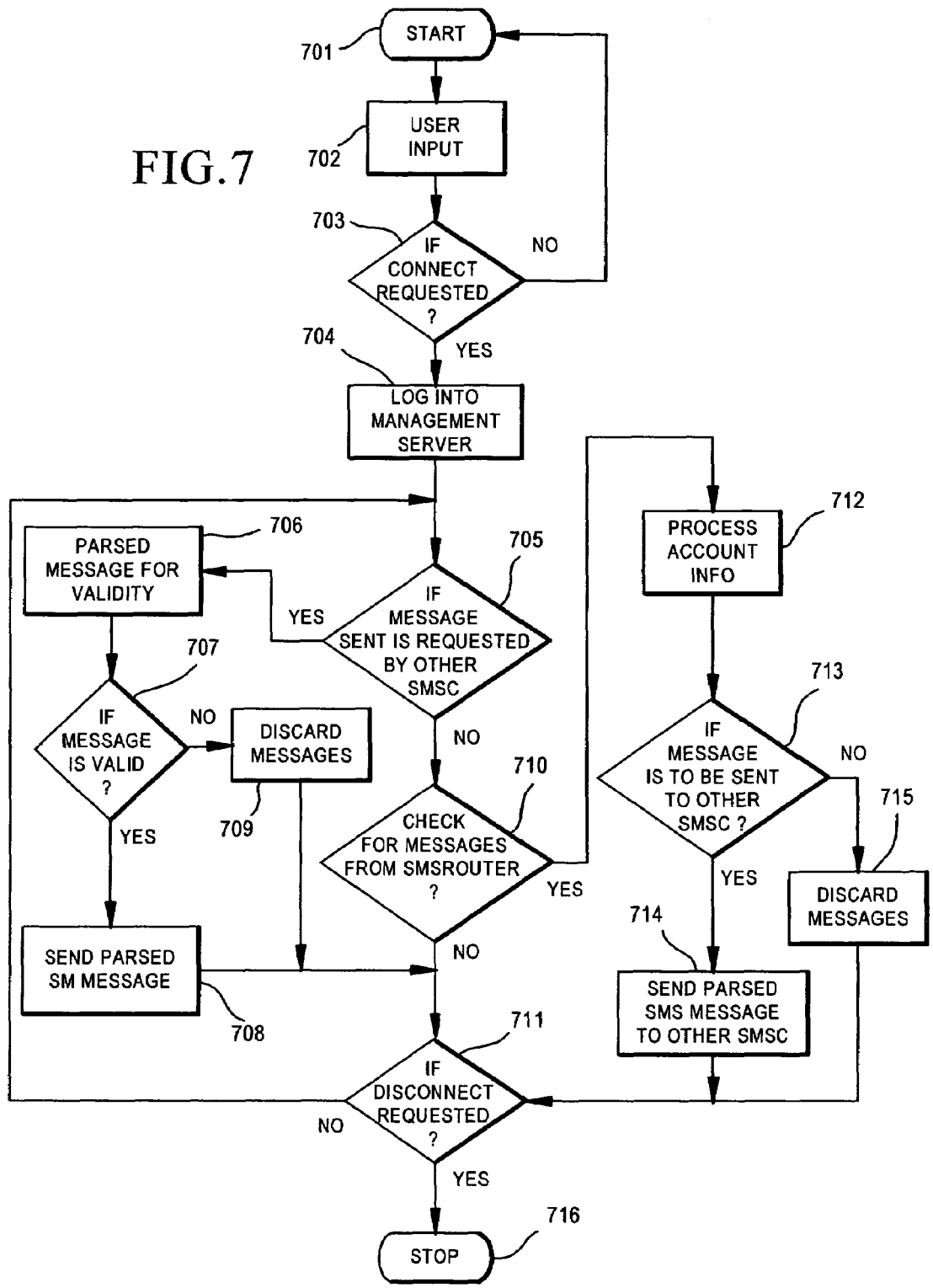
FIG. 7 is a block diagram showing the operational algorithm for the bridging program, according to the disclosure herein.

Another program that can be placed on the management server is the bridging program. The bridging program is not essential for the system disclosed herein. Instead, the bridging program is a program that can be added to the system to allow the system to exchange SMS messages with the SMS centers of wireless carriers. The bridging program checks messages, sent to it from the management server, to determine if the messages should be delivered to an external carrier. If the messages should be delivered to an external carrier, the bridging program connects to the carriers network via HyperText Transfer Protocol (http). Likewise, a message in the wireless carrier's network can be delivered to the system disclosed herein via http through the bridging program. The bridging program is referred to below as "SMBridge." Referring to FIG. 7, the bridging program operates according to the following event driven algorithm:

SMSBridge Algorithm
1. Wait for user input.
   a. If there is user input 702, go to 2.
2. Determine if there is a connection request 703.
   a. If there is a connection request, log into management server 704 and go to 3.
   b. If there is no connection request, loop to 1.
3. Determine if there is a message is from a wireless carrier's SMSC 705.
   a. If there is a message, parse the message to check for validity 706 and go to 4.
   b. If there is no message, go to 5.
4. Determine if the message is valid, 707.
   a. If the message is valid, send the message to the management server for processing 708 and go to 6.
   b. If the message is not valid, discard message 709 and go to 6.
5. Determine if there is a message from the routing program 710.
   a. If there is a message, process the sender's account information 712 and go to 6.
   b. If there is no message, go to 7.
6. Determine if the message is for a wireless carrier's SMSC.
   a. If the message is for a SMSC, send the message to the carrier's SMC 714 and go to 7.
   b. If the message is not for an SMSC, discard the message 715 and go to 8.
7. Determine if a disconnection is requested 711.
   a. If there is a disconnection request, disconnect and stop 716.
   b. If there is no disconnection request, loop to 3.

Figure 8:
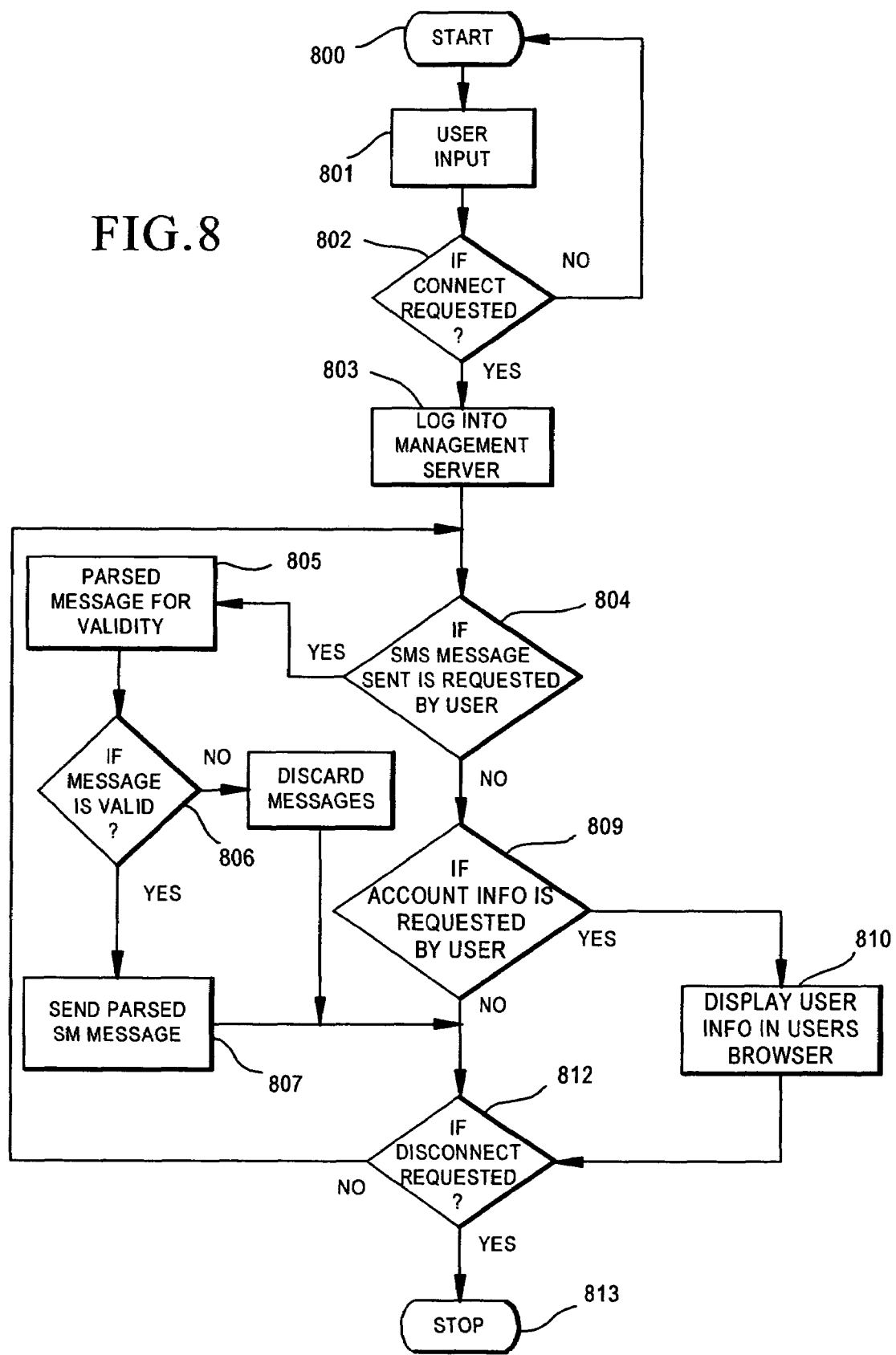
FIG. 8 is a block diagram showing the operational algorithm for a program that allows clients to send and retrieve messages using an HTML based interface, according to the disclosure herein.

The program that allows a user to send messages to a recipient's cellular telephone and receive messages from a cellular telephone on the user's computer is referred to below as the "webserver" program. This program communicates with the management server and allows users to send and receive SMS messages using an HTML based web interface. This program also allows a user to access his or her account information via the user's computer. To use this feature of the system, a user can log into the server using a standard web browser. Referring to FIG. 8, the webserver program operates according to the following event driven algorithm:

Webserver Algorithm
1. Wait for user input.
   a. If the is user input 801, go to 2.
2. Determine if a connection is requested 802.
   a. If a connection is requested, log into management server 803 and go to 3.
   b. If a connection is not requested, loop to 1.
3. Determine if the user is requesting to send an SMS message 804.
   a. If the user is requesting to send an SMS message, parse the message to check it for validity 805 and go to 4.
   b. If the user is not requesting to send an SMS message, go to 5.
4. Determine if the message is valid 806.
   a. If the message is valid, send the message to the management server for processing 807 and go to 6.
   b. If the message is not valid, discard message 808 and go to 6.
5. Determine if the user is requesting account information 809.
   a. If the user is requesting account information, display user's account information 810 and go to 6.
   b. If the user is not requesting account information, go to 6.
6. Determine if a disconnection is requested 812.
   a. If there is a disconnection request, disconnect and stop 813.
   b. If there is no disconnection request, loop to 4.

The program that allows a user to send messages to a recipient's cellular telephone and receive messages from a cellular telephone via the user's email account is referred to below as the "mail gateway" program. This program communicates with the management server and allows users to send and receive SMS messages via an email account. To use this feature of the system a user can create a regular SMS message in the user's email program, and addresses the message to the desired recipient's telephone number at the management server's address (recipient'snumber@managementserver.com). The mail gateway program will receive the email, parse the email for the recipient's phone number and the sender's account information, and send the message to the management server for delivery.

Figure 10:
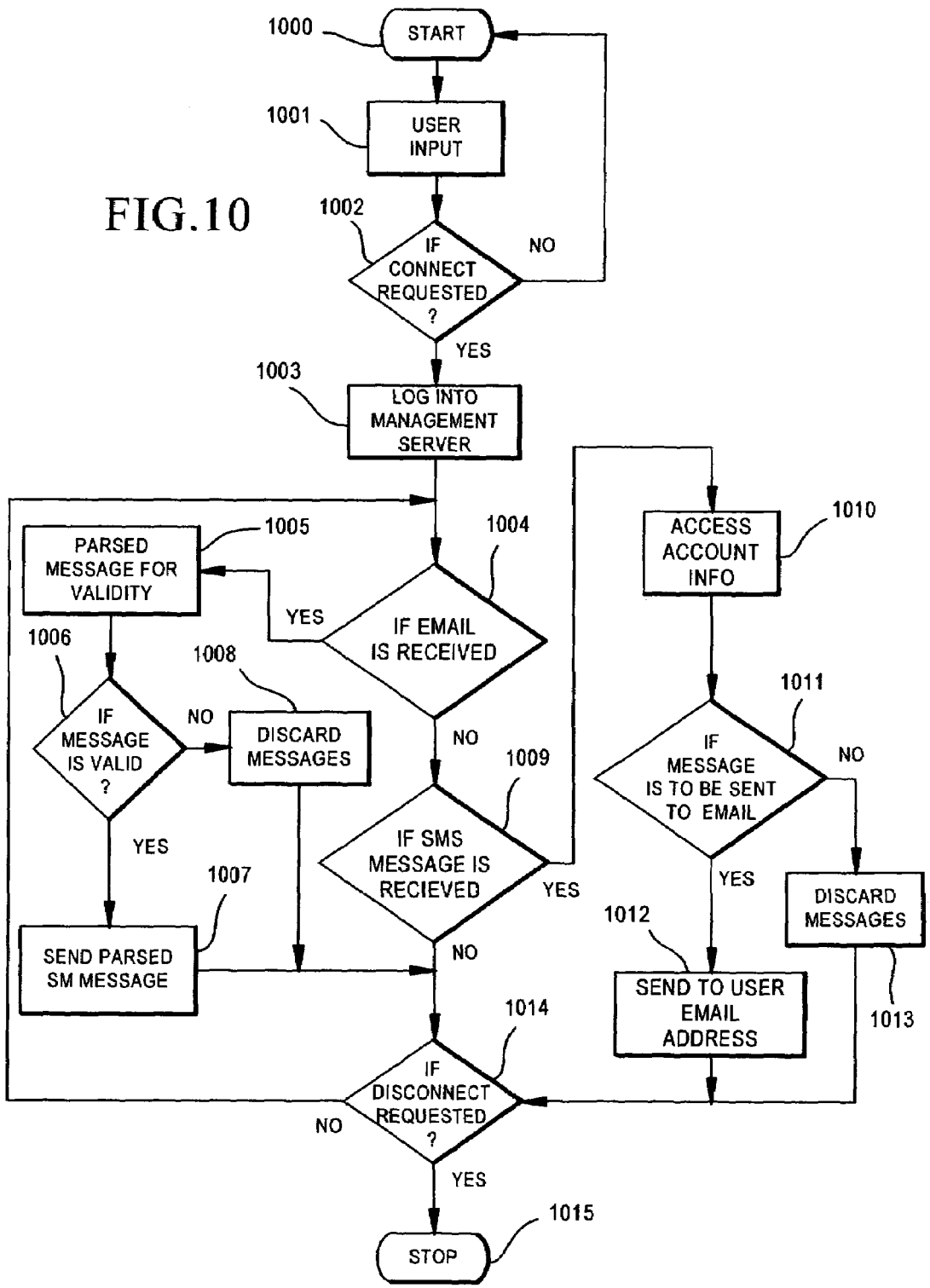
FIG. 10 is a block diagram showing the operational algorithm for a program that allows clients to send and retrieve messages via the client's email account, according to the disclosure herein.

A user's account can also be set up to receive SMS messages via email. When an account has been set up to use this feature, the routing program will send the message to the mail gateway program for email delivery to a user's email address. Referring to FIG. 10, the mail gateway program operates according to the following event driven algorithm:

Mail Gateway Algorithm
1. Wait for user input.
   a. If the is user input 1001, go to 2.
2. Determine if a connection is requested 1002.
   a. If a connection is requested, log into management server 1003 and go to 3.
   b. If a connection is not requested, loop to 1.
3. Check for incoming email messages 1004.
   a. If there is an email message, parse the message to check for validity 1005 and go to 4.
   b. If are no email messages, go to 5.
4. Determine if the message is valid 1006.
   a. If the message is valid, send the message to the management server for processing 1007 and go to 7.
   b. If the message is not valid, discard message 1008 and go to 7.
5. Check for messages from the routing program 1009.
   a. If there is a message from the routing program, access the user's account information 1010 and go to 6.
   b. If there are no messages from the routing program, go to 7.
6. Determine if the message is for a user's email address 1011.
   a. If the message is for a users email address, send message to the user's email address 1012 and go to 7.
   b. If the message is not for a users email address, discard message 1013 and go to 7.
7. Determine if a disconnection is requested 1014.
   a. If there is a disconnection request, disconnect and stop 1015.
   b. If there is no disconnection request, loop to 3.

It should be noted that the algorithms of the system disclosed herein, illustrated with the use of flow charts, are multithreaded event driven algorithms. Therefore, the system is capable of simultaneously sending and receiving a plurality of messages to support requests from one or more users.

According to the disclosure of this application, SMS messages can be sent to people in different cellular networks over the Internet. Using the system, messages can be sent to non-client cellular telephones from a client's telephone or personal computer. Messages can also be sent and received by clients on their cellular phones or personal computers.

To send an SMS message over the system disclosed herein, a client enters the message on a user device. If the client is sending the message from a cell phone, the client connects with a hardware device in the network where the client is located and the hardware device forwards the message to the management server. If the client is sending the message from his or her computer, the client sends the message directly to the management server.

The management server determines the route that the message must take to reach the intended recipient, and routes the message accordingly. If the recipient can only receive the message via cellular telephone the management server forwards the message to the hardware device in the recipient's network, and the hardware device forwards the message to the recipient. If the recipient can receive the message on his or her email program, the management server also forwards the device to the recipient's email. If the recipient can retrieve the message using an HTML based interface, the management server stores the message for retrieval.

INDUSTRIAL APPLICABILITY

The invention has applicability to the field of cellular communications. In particular, the present invention describes a system and method for sending SMS and text messages between wireless communication networks. The system disclosed herein is comprised of a variety of physical components and these components can be programmed to operate according to event driven algorithms. The physical components of the system include, sms devices (which are cellular telephones connected to computers) servers, and user devices such as cellular telephones and personal computers.

The sms devices are connected to the Internet via standard connection means and the servers are connected to the Internet via regular TCP/IP connection. The user devices are connected to the system via Internet connections, in the case of a user's computer, or through the cellular telephone network, in the case of a user's cellular telephone.

The system allows user's to send SMS/text messages to recipients in other cellular telephone networks without using the network bridges established by the user's cellular provider. Messages sent using the system disclosed herein can be sent from cellular telephones or computers, and they can be received on cellular telephones or computers. A user sending or receiving a message on a computer can use either an email program or an HTML based interface.

This system is advantageous to users communicating to recipients in distant networks because the user will not have worry about his or her text message being assigned a low priority by his or her cellular provider.

In compliance with the statutes, the invention has been described in language more or less specific as to structural features. It is to be understood, however, that the invention is not limited to the specific features shown or described, since the means and construction shown or described comprise preferred forms of putting the invention into effect. Additionally, while this invention is described in terms of being used for sending SMS messages and text messages between wireless communication networks, it will be readily apparent to those skilled in the art that the invention can be adapted to other uses as well. Therefore, the invention should not be construed as being solely limited to use in SMS messaging, and is therefore, claimed in any of its forms or modifications within the legitimate and valid scope of the appended claims.

What is claimed is:

1. A system for sending and receiving SMS messages between SMS message devices located in different wireless networks without traversing a network bridge in either wireless network, said system comprising:

a plurality of SMS devices, each said SMS device being connectable to the internet and connectable to a wireless network and having a machine readable storage, having stored thereon a computer program comprising a plurality of code sections executable by a machine whereby SMS messages arriving at said SMS device from a wireless network may be sent to the internet, and SMS messages arriving at said SMS device from the internet may be sent to said wireless network without said SMS messages being passed through a network bridge attached to said wireless network;

a first wireless network having at least a first SMS device and a first network bridge, said first network bridge comprising a short message service center (SMSC) and means for connecting said SMSC to external networks, said first SMS device being connected to the internet and connected to said first wireless network such that SMS messages arriving at said first SMS device from said first wireless network may be sent to the internet, and SMS messages arriving at said first SMS device from the internet may be sent to said first wireless network without said SMS messages being passed through said first network bridge;

a second wireless network having at least a second SMS device and a second network bridge, said second network bridge comprising a short message service center (SMSC) and means for connecting said SMSC to external networks, said second SMS device being connected to the internet and to said second wireless network, such that SMS messages arriving at said second SMS device from said second wireless network may be sent to the internet, and SMS messages arriving at said second SMS device from the internet may be sent to said second wireless network without said SMS messages being passed through said second network bridge;

at least one server that is connected to the Internet, said server having a machine readable storage, having stored thereon a computer program comprising a plurality of code sections executable by a machine for maintaining a plurality of interrelated tables comprising a database, said database containing user-provided information cross-referencing SMS user devices, and predetermined routing and identification information for verifying SMS message authorization, and for routing SMS messages to selected, identified SMS message recipients;

whereby an SMS message sent from a sending user device in said first wireless network and directed to a recipient user device in said second wireless network may be routed through said first SMS device to said server via the internet, may be analyzed for further routing information by said server, and may be further routed to said recipient's SMS device via the internet and said second SMS device, and said server may debit an identified user's account.

2. The system of claim 1, wherein said at least a first SMS device in said first wireless network comprises one of a plurality of SMS devices in said first wireless network; said at least a second SMS device in said second wireless network comprises one of a plurality of SMS devices in said second wireless network; and said second wireless network comprises one of a plurality of wireless networks.

3. The system of claim 1, wherein said first and said second SMS devices each comprise a cellular telephone connected to a computer.

4. The system of claim 1, wherein said first SMS device is further programmed to assist said server in determining which other SMS device to forward said SMS messages to when such messages are received from said first wireless network.

5. The system of claim 1 wherein said server is a computer.

6. The system of claim 1 further comprising a plurality of user computers that are programmed to communicate with said server across the internet , said user computers having means for sending and receiving SMS messages.

7. The system of claim 6, wherein said server is further programmed to forward SMS messages for authorized users of the system to the user's email account.

8. The system of claim 6, wherein said server is further programmed to store SMS messages and allow authorized users of the system to send and retrieve SMS messages via an HTML based interface on the Internet.

9. The system of claim 6, further said server further comprising one or more executable code sections that allow said server to receive an SMS message from one of said user computers, determine routing information from said database to direct said SMS message to the intended recipient of said SMS message, and forward said SMS message to a SMS device in the wireless communication network where said intended recipient is located for further forwarding to said intended recipient.

10. The system of claim 9, further comprising e-mail accounts whereby SMS messages can be sent or received as e-mail, and one or more of said executable code sections in said computer program on said server causes said server to receive SMS messages sent from an e-mail account or to forward SMS messages to an email account, as directed by instructions comprising said personalized information maintained in said database.

11. The system of claim 9, wherein one or more of said executable code sections in said computer program on said server causes said server to store SMS messages whereby authorized users can send and retrieve SMS messages using an HTML based interface on the Internet.

12. The system of claim 9 further comprising a plurality of servers connected to the Internet, each said server having a machine readable storage and having stored thereon a computer program comprising a plurality of code sections executable by a machine to cause said servers to exchange information concerning SMS messages and user accounts across the Internet.

\* \* \* \* \*